United States Patent Office 2,845,480
Patented July 29, 1958

2,845,480

OPTICAL STRUCTURE FOR COLOR-IMAGE-REPRODUCING APPARATUS OF THE PROJECTION TYPE

William F. Bailey, Valley Stream, and Robert P. Burr, Huntington, N. Y., assignors to Hazeltine Research, Inc., Chicago, Ill., a corporation of Illinois Application April 16, 1954, Serial No. 423,745

10 Claims. (Cl. 178—5.4)

General

This invention relates to optical structures for color-image-reproducing apparatus of the projection type.

Various previously proposed optical structures for color-image-reproducing apparatus have been subject to one or more severe limitations which render the structures unsuitable in some respects for certain applications, such as home color-television receivers of the image-projection type. It is, of course, of paramount importance that any optical structure for color-image-reproducing apparatus of the projection type be of absolutely rigid construction so that normal vibrational disturbances resulting, for example, from shipment or from ordinary household activities do not displace critical components of the optical system with respect to each other or the cathode-ray image-reproducing tubes associated therewith. Any such displacements are extremely objectionable because they degrade the register or focus of the images projected to the display screen of the apparatus. Degradation of register ordinarily causes color distortion in the composite image reproduced at the display screen while degradation of focus ordinarily causes image blurring.

It is also equally necessary from a practical standpoint that the color-image-reproducing apparatus as a whole, including the cathode-ray image-reproducing tubes thereof, be a compact unit of minimum physical size suitable for disposition in a color-television receiver attractive to the consumer for home use. Optical structures for color-image-reproducing apparatus of the projection type heretofore proposed, in general, do not provide adequate mechanical rigidity or physical compactness for color-image-reproducing apparatus. For example, one previously proposed structure supports the cathode-ray devices associated therewith with axes extending radially in three directions, thereby causing the image-reproducing apparatus to be undesirably bulky and cumbersome. Because of these limitations, it has generally been considered by leaders in the television receiver field that color-television receivers of the image-projection type suitable for home use are entirely impractical and commercially unfeasible.

It is an object of the present invention, therefore, to provide a new and improved optical structure for color-image-reproducing apparatus of the projection type which avoids one or more of the above-mentioned disadvantages of such structures heretofore proposed.

It is another object of the invention to provide a new and improved optical structure of the type described which is capable of maintaining the image register of the cathode-ray image-reproducing tubes associated therewith notwithstanding normal environmental vibrational disturbances.

It is another object of the invention to provide a new and improved optical structure of the type described which is suitable for use in a home color-television receiver.

It is another object of the invention to provide a new and improved optical structure of the type described which has a maximum mechanical rigidity.

It is another object of the invention to provide a new and improved optical structure of the type described of maximum compactness.

In accordance with a particular form of the invention, an optical structure for color-image-reproducing apparatus of the projection type comprises a rigid frame support and optical dichroic means attached to the support. The optical structure also includes a plurality of rigid optical-support units for cathode-ray image-reproducing tubes individually rigidly attached to the frame support and individually having optical axes adapted for predetermined angular disposition with respect to the axes of the cathode-ray tubes and the units include rigidly mounted optical systems for individually projecting component color images to the dichroic means for translation, thereby providing a rigid unitary optical structure.

For a better understanding of the present invention, together with other and further objects thereof, reference is had to the following description taken in connection with the accompanying drawings, and its scope will be pointed out in the appended claims.

Referring to the drawings:

Fig. 2a is a fragmentary sectional view of the frame support taken along line 2a—2a of Fig. 2 and representing in detail the disposition of a dichroic mirror therein, while

Figure 1:
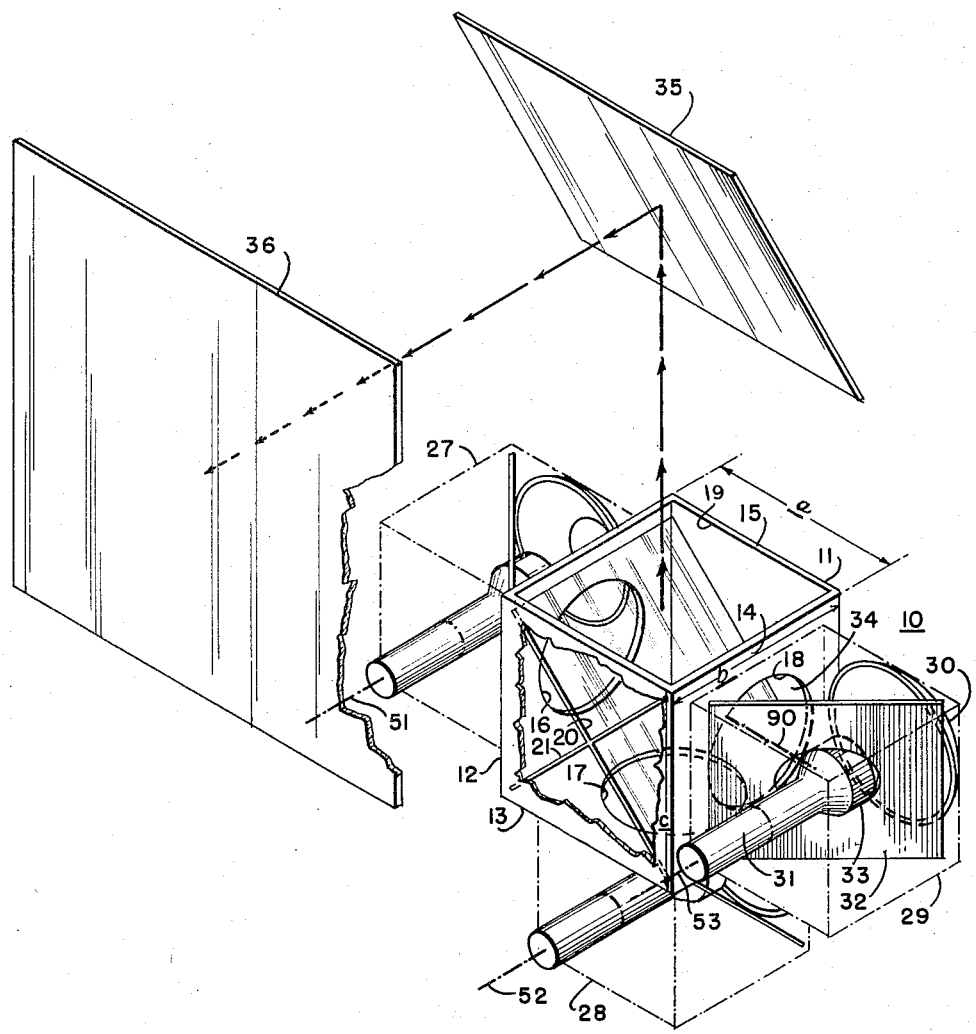
Fig. 1 is a perspective view, partly diagrammatic, of color-image-reproducing apparatus including an optical structure constructed in accordance with the invention.

Description of Fig. 1 optical structure

Referring now more particularly to Fig. 1 of the drawings, an optical structure 10 for color-image-reproducing apparatus of the projection type and constructed in accordance with the invention comprises a rigid frame or box support 11 preferably in the form of a hollow right parallelepiped of suitable metal construction. The box 11 preferably includes three faces or walls 12, 13, 14 and an open face 15 having light-transmission apertures 16, 17, 18, 19, respectively. The apertures 16, 17, 18, 19 may, for example, be covered with suitable light-transmissive material, such as glass, or may simply be openings in the support 11.

Figure 2:
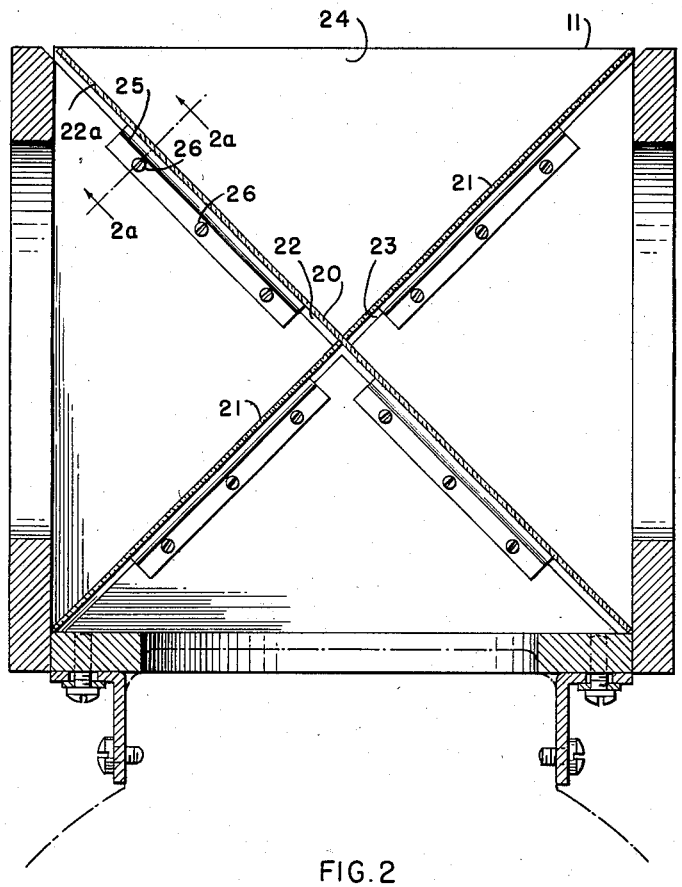
Fig. 2 is a sectional view of a frame support of the Fig. 1 apparatus.
Figure 2A:
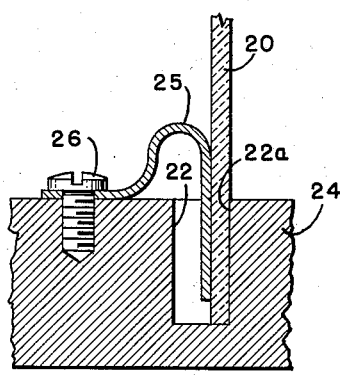

The optical structure 10 includes optical dichroic means rigidly attached to the support 11 and preferably comprising a pair of optical dichroic crossed plane mirrors 20, 21 diagonally and rigidly disposed within the support 11 as represented in Fig. 1 and Fig. 2. As represented in Fig. 2, mirrors 20 and 21 are disposed in slots 22 and 23 which are precisely located, respectively, in an end wall 24 of the support 11. The opposite end wall (not shown in Fig. 2) preferably is slotted in a similar manner. As represented in Figs. 2 and 2a, the mirror 20 may be resiliently but firmly clamped against a wall 22a of the slot 22 by a suitable leaf spring element 25 attached to the end wall 24 of the support 11 by screws 26, 26. The mirror 21 may be positioned in a similar manner. The mirror 20 may, for example, comprise a single red and green light-transmissive and blue light-reflective mirror section while the mirror 21 may, for example, include two blue and green light-transmissive and red light-reflective mirror sections abutting the mirror 20.

The optical structure 10 also includes a plurality of rigid optical-support units for cathode-ray image-reproducing tubes and individually rigidly attached to the box support 11 and individually having optical axes adapted for predetermined angular disposition with respect to, and preferably individually substantially normal to, the axes of the tubes represented by broken lines 51, 52, 53, as more fully described subsequently. Accordingly, the optical-support units preferably individually have light-transmission apertures individually substantially parallel to the tube axes 51, 52, 53. The optical-support units include optical systems individually rigidly attached to the units for transmitting component color images to the dichroic means for translation and reflection, thereby providing a rigid unitary optical structure. More particularly, there preferably are provided three optical-support units 27, 28, and 29, diagrammatically represented in broken-line construction, attached to the surfaces 12, 13, and 14, respectively, of the support 11. The units 27, 28, and 29 preferably are of substantially identical construction and may, for example, be similar to a conventional type of projection optical unit, such as that manufactured and sold by the North American Philips Co., under the name of "Protelgram System." A system of the "Protelgram" type is described in an article entitled "Home projection television, Part I, Cathode-ray tube and optical system" by Rinia, De Gier, and Van Alphen, Proceedings of the I. R. E., March 1948.

Considering for the moment the unit 29, that unit preferably includes a light-condensing spherical mirror 30 rigidly disposed opposite the face of a cathode-ray tube 31 supported by the unit. The optical system preferably also includes a plane mirror 32 having an aperture 33 therein for insertion of the cathode-ray tube 31 and fixedly disposed at approximately a 45° angle with respect to the axis of the cathode-ray tube. The optical system also preferably includes an aspherical correction lens 34 of conventional type fixedly disposed in the light-transmission aperture of the unit 29 for focusing a component color image and for transmitting the same through the aperture of the surface 14 of the support 11 to the dichroic mirrors 20, 21 for translation and reflection through the open face 15. The optical axis of the unit 29 is considered herein as an axis normal to the plane of the lens 34 and passing through the center of the lens, as represented by broken line 90.

The color-image-reproducing apparatus of Fig. 1 preferably also includes a plane mirror 35 suitably positioned with respect to the optical structure 10 for reflecting component color images transmitted thereby to a display screen 36 comprising suitable diffusing material.

Figure 3:
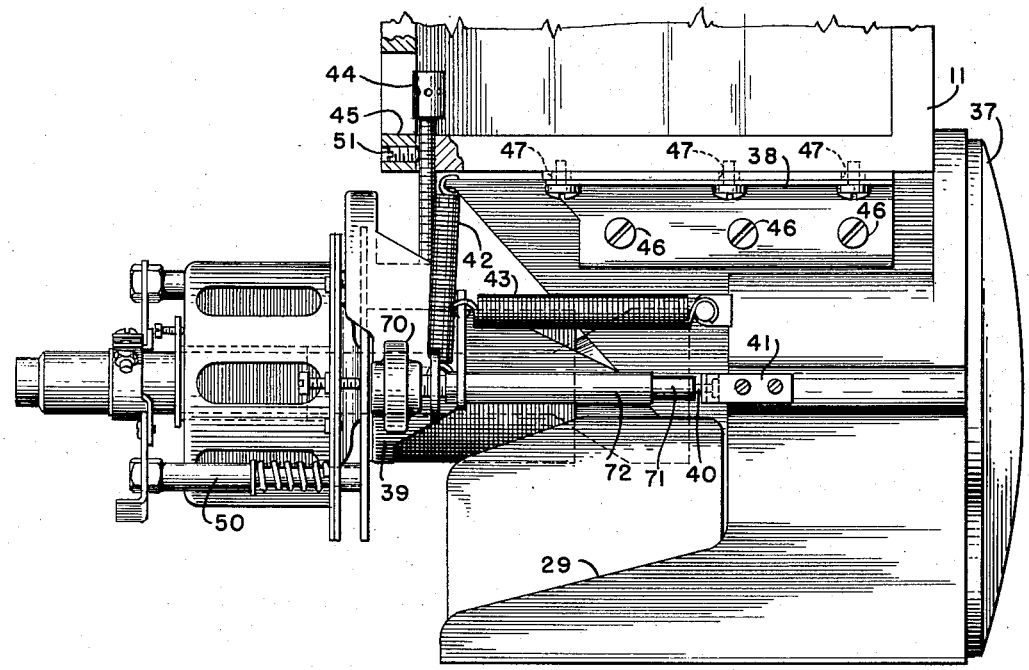
Fig. 3 is a top view of an optical-support unit of the Fig. 1 apparatus representing in detail the adjustable members utilized to position a cathode-ray tube in the unit.

Referring now more particularly to Fig. 3, there is represented a top view of one of the optical-support units, for example, the unit 29, attached to the box 11. The unit 29 comprises, for example, a frame or housing 37 attached to the box 11 by a suitable bracket 38. The bracket 38 preferably has oversize holes 47, 47, 47 therein for laterally adjusting the position of the unit 29 with respect to the box 11. The dimensions of the box 11 and the position of the mounting holes 46, 46, 46 in the bracket 38 and the housing 37 preferably are precisely determined to maintain the aspherical correction lens of the unit 29 at a predetermined distance, for example, 4⅛ inches, from the intersection of the dichroic mirrors within the support 11.

There is adjustably mounted on the housing 37 a support 39 for a cathode-ray tube for positioning the center of curvature of the cathode-ray tube screen preferably along an axis which is the virtual image of the axis 90 in the mirror 32 of Fig. 1, thereby aligning the longitudinal axis of the cathode-ray tube 31 in a substantially parallel relation with the axes of the cathode-ray tubes supported by the other optical-support units. A control knob 70 is provided for adjusting the position of support 39 by adjustment of a threaded screw 71 extending through a sleeve 72 of the support 39 and having a tip 40 disposed in a socket 41 on the housing 37. Thus, the support 39 is pivotally mounted on the housing 37 by the tip 40 of the screw 71 disposed in socket 41 and is maintained in position by springs 42 and 43 and an adjustable cap screw 44 mounted in the box 11 and accessible through an aperture 45 therein. A suitable lock screw 51 for the screw 44 is threaded in a bore in box 11. Similar springs and adjustable elements on the other side of the unit 29 (not shown) are also provided for universally positioning the support 39. A focus winding structure 50 for providing electron-beam focusing preferably is adjustably positioned on the support 39 by suitable means (not shown).

The other optical-support units 27, 28 preferably are mounted in substantially the same manner so that the aspherical correction lenses thereof are the same distance from the intersection of the crossed dichroic mirrors 20, 21 as the correction lens of the unit 29.

*Adjustment and operation of optical structure*

The optical-support units 27, 28, 29 with cathode-ray tubes inserted therein are rigidly attached to the frame support 11 as represented in Fig. 1 with the light-transmission apertures thereof in approximate alignment with the light-transmission apertures of the support 11 and with the adjustable elements of the focus winding structures thereof and the cathode-ray tube positioning elements accessible at a common face of the optical structure 10. The cathode-ray tube supports, such as the support 39 of Fig. 3, may be positioned by suitable means, such as the screw 44, preferably to locate the center of curvature of the cathode-ray tube screen along an axis which is the virtual image of axis 90 in the mirror 32 to provide optical focus of the projected images on the display screen. To provide substantial alignment of the projected images developed on the display screen, positioning of the individual focus windings relative to the cathode-ray tubes will ordinarily be necessary and the position of the support units on the support 11 may be altered slightly, if necessary. When the cathode-ray tubes project images in register to the screen 36, the adjustable elements may be rigidly secured to maintain the structure as a rigid unitary structure capable of withstanding normal vibrational disturbances.

In the operation of the image-reproducing apparatus of Fig. 1, a color image projected by, for example, the cathode-ray tube 31 to the corresponding spherical mirror 30 is condensed by the mirror and reflected to the plane mirror 32 which directs the same through the light-transmission aperture and aspherical correcting lens 34 of the unit 29. The other cathode-ray tubes and optical systems operate in a similar manner and the component color images developed thereby are then reflected and translated by the dichroic mirrors 20 and 21 through the aperture 19 of the support 11 to the mirror 35 and the screen 36 to provide a composite color image thereon.

While applicants do not wish to be limited to any particular structural parameters, the following have been found to be satisfactory in a structure constructed in accordance with the invention:

| | |
|---|---|
| Support 11 | 5-sided ½ inch aluminum right parallelepiped. |
| Outer dimensions a, b, c of support 11 | 8¾ x 8 x 8¼ inches, respectively. |
| Corresponding inner dimensions of support 11 | 7¾ x 7 x 7¾ inches, respectively. |
| Apertures in faces 12, 13, 14 | 5¾, 5⅝, 5¾ inches diameter, respectively, centrally disposed. |
| Units 27, 28, 29 | Cathode-ray tube units as described. |
| Mirror 20 | Reflective over approximate range of 400–480 millimicrons, transmissive over approximate range of 500–700 millimicrons, approximate transition range 480–500 millimicrons, for angle of incidence of 45°. |

| | |
|---|---|
| Mirror 21 | Reflective over approximate range of 590–700 millimicrons, transmissive over approximate range of 400–560 millimicrons, approximate transition range 560–590 millimicrons, for angle of incidence of 45°. |
| Angle between mirrors 20 and 21 | 90°. |
| Spacing of aspherical correction lenses of units 27, 28, 29 from intersection of mirrors 20, 21 | 4⅛ inches. |

From the foregoing description it will be apparent that an optical structure for color-image-reproducing apparatus of the projection type constructed in accordance with the invention has the advantages of being a compact and rigid unitary structure capable of withstanding normal vibrational disturbances without destroying the register of the cathode-ray devices supported thereby. Since the structure may be constructed to support three cathode-ray tubes with the longitudinal axes thereof parallel to each other, the over-all space required by the assembly including the cathode-ray tubes is minimized, which is an extremely important consideration for home television receiver applications.

Moreover, since the optical structure may be positioned as a unit within a suitable cabinet, the relative alignment of the elements of the structure is not affected by warping or other distortion of the cabinet. Also, the structure has the important advantage that the adjustable elements controlling the optical focus and the electron optical focus are conveniently accessible at a common face of the structure. Further, because the optical structure is compact, much of the light paths for images projected by the three optical-support units are congruent and any optical elements, such as mirrors, disposed in the congruent path cause no degradation of register.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A projector for superimposing three multicolor television images in register to be viewed as a single image by an observer comprising: a pair of dichroic elements intersecting at right angles; three cathode-ray tubes positioned with their axes parallel to the intersection axis of the dichroic elements and their bases extending in the same direction and their screens each adjacent different ones of the dihedral angles of the dichroic elements; a rigid support for said dichroic elements and said cathode-ray tubes; and optical means for directing images on the cathode-ray tubes into the adjacent dihedral angles so that all emerge in register from the fourth dihedral angle.

2. A projector for superimposing three multicolor television images in register to be viewed as a single image by an observer comprising: a hollow box; a pair of dichroic elements intersecting at right angles mounted in the box; three support units mounted on three outer surfaces of the box; three cathode-ray tubes individually positioned on the support units with their axes parallel to the intersection axis of the dichroic elements and their bases extending in the same direction and their screens each adjacent different ones of the dihedral angles of the dichroic elements; and optical means positioned on the support units for directing images on the cathode-ray tubes into the adjacent dihedral angles so that all emerge in register from the fourth dihedral angle.

3. A projector for superimposing three multicolor television images in register to be viewed as a single image by an observer comprising: a pair of dichroic elements intersecting at right angles; three cathode-ray tubes positioned with their axes parallel to the intersection axis of the dichroic elements and their bases extending in the same direction and their screens each adjacent different ones of the dihedral angles of the dichroic elements; a rigid support for said dichroic elements and said cathode-ray tubes; and optical means individually including spherical mirrors opposite the cathode-ray tube faces, plane mirrors at 45° angles with respect to the cathode-ray tube axes, and aspherical correction lenses parallel to the cathode-ray tube axes for directing images on the cathode-ray tubes into the adjacent dihedral angles so that all emerge in register from the fourth dihedral angle.

4. An optical structure for color-image-reproducing apparatus of the projection type comprising: a hollow box in the form of a right parallelepiped; a pair of optical dichroic crossed plane mirrors diagonally disposed within said box and attached thereto; and three rigid optical-support units for cathode-ray image-reproducing tubes individually rigidly attached to said box and individually having light-transmission apertures in planes individually adapted for substantially parallel alignment with the axes of said cathode-ray tubes and said units including rigidly mounted optical systems individually including light-condensing spherical mirror means, light-directing plane mirror means, and aspherical correction lens means for individually focusing component color images and for projecting the same to said dichroic mirrors for translation, thereby providing a rigid unitary optical structure.

5. An optical structure for color-image-reproducing apparatus of the projection type comprising: a rigid frame support comprising a hollow box in the form of a right parallelepiped; a pair of optical dichroic mirrors attached within said support; and a plurality of rigid optical-support units for cathode-ray image-reproducing tubes individually rigidly attached to said support and individually having optical axes adapted for predetermined angular disposition with respect to the axes of said cathode-ray tubes and said units including rigidly mounted optical systems for individually projecting component color images to said dichroic means for translation, thereby providing a rigid unitary optical structure.

6. An optical structure for color-image-reproducing apparatus of the projection type comprising: a rigid frame support comprising a hollow box in the form of a right parallelepiped; a pair of optical dichoric crossed plane mirrors diagonally disposed within said box and attached thereto; and a plurality of rigid optical-support units for cathode-ray image-reproducing tubes individually rigidly attached to outer surfaces of said box and individually having optical axes adapted for predetermined angular disposition with respect to the axes of said cathode-ray tubes and said units including rigidly mounted optical systems for individually projecting component color images to said dichroic mirrors for translation, thereby providing a rigid unitary optical structure.

7. An optical structure for color-image-reproducing apparatus of the projection type comprising: a rigid frame support including four surfaces individually having light-transmission apertures therein; optical dichroic means attached to said support; and three rigid optical-support units for cathode-ray image-reproducing tubes individually rigidly attached to three of said surfaces of said support and individually having optical axes adapted for predetermined angular disposition with respect to the axes of said cathode-ray tubes and said units including rigidly mounted optical systems for individually projecting component color images through the apertures of said three surfaces to said dichroic means for translation and reflection through the aperture of said fourth surface, thereby providing a rigid unitary optical structure.

8. An optical structure for color-image-reproducing apparatus of the projection type comprising: a rigid frame support; optical dichroic means attached to said support; and a plurality of rigid optical-support units individually rigidly attached to said support and individually having optical axes and including adjustable means for positioning the longitudinal axes of said cathode-ray tubes in a predetermined angular relation with respect to said optical axes and in a substantially parallel relation with each other and said units including rigidly mounted optical systems for individually projecting component color images to said dichroic means for translation, thereby providing a rigid unitary optical structure.

9. An optical structure for color-image-reproducing apparatus of the projection type comprising: a rigid frame support; optical dichroic means attached to said support; and a plurality of rigid optical-support units for cathode-ray image-reproducing tubes individually rigidly attached to said support and individually having optical axes adapted for predetermined angular disposition with respect to the axes of said cathode-ray tubes and said units including rigidly mounted optical systems individually including light-condensing spherical-mirror means, light-directing plane-mirror means, and aspherical correction lens means for individually focusing component color images and for individually projecting the same to said dichroic means for translation, thereby providing a rigid unitary optical structure.

10. An optical structure for color-image-reproducing apparatus of the projection type comprising: a rigid frame support; optical dichroic means attached to said support; and a plurality of rigid optical-support units for cathode-ray image-reproducing tubes individually rigidly attached to said support and individually having light-transmission apertures in planes individually adapted for substantially parallel alignment with the axes of said cathode-ray tubes and said units including rigidly mounted optical systems individually including light-condensing spherical mirrors disposed opposite the faces of said cathode-ray tubes, light-directing plane mirrors having apertures therein for insertion of said cathode-ray tubes and disposed at approximately a 45° angle with respect to said axes of said cathode-ray tubes, and aspherical correction lenses disposed in said light-transmission apertures for individually focusing component color images and for individually projecting the same to said dichroic means for translation, thereby providing a rigid unitary optical structure.

References Cited in the file of this patent

UNITED STATES PATENTS

| | | |
|---|---|---|
| 2,568,543 | Goldsmith | Sept. 18, 1951 |
| 2,672,502 | Albright | Mar. 16, 1954 |
| 2,740,829 | Gretener | Apr. 3, 1956 |